(12) United States Patent
Takeuchi

(10) Patent No.: US 12,555,412 B2
(45) Date of Patent: Feb. 17, 2026

(54) INFORMATION PROCESSING APPARATUS, INFORMATION PROCESSING METHOD, NOTIFICATION SYSTEM, AND STORAGE MEDIUM

(71) Applicant: CANON KABUSHIKI KAISHA, Tokyo (JP)

(72) Inventor: Toshio Takeuchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 403 days.

(21) Appl. No.: 18/332,011

(22) Filed: Jun. 9, 2023

(65) Prior Publication Data
US 2023/0410557 A1 Dec. 21, 2023

(30) Foreign Application Priority Data
Jun. 20, 2022 (JP) .................................. 2022-098687

(51) Int. Cl.
G06V 40/16 (2022.01)
G06V 40/20 (2022.01)

(52) U.S. Cl.
CPC .......... G06V 40/174 (2022.01); G06V 40/172 (2022.01); G06V 40/20 (2022.01)

(58) Field of Classification Search
CPC .... G06V 40/174; G06V 40/172; G06V 40/20; G06V 20/52
See application file for complete search history.

(56) References Cited

U.S. PATENT DOCUMENTS

| | | | | |
|---|---|---|---|---|
| 10,133,918 B1* | 11/2018 | Chang | .................. | G06V 40/175 |
| 10,629,225 B2* | 4/2020 | Maekawa | ............... | G10L 15/04 |
| 11,093,904 B2* | 8/2021 | Humble | ................. | A61B 5/165 |
| 11,165,728 B2* | 11/2021 | Lee | ....................... | H04L 51/222 |
| 11,763,229 B2* | 9/2023 | Li | ...................... | G06Q 30/0633 |
| | | | | 705/7.26 |

(Continued)

FOREIGN PATENT DOCUMENTS

| | | | |
|---|---|---|---|
| JP | 2005-284408 A | 10/2005 | |
| JP | 2010-207537 A | 9/2010 | |
| JP | 2021-087065 A | 6/2021 | |

*Primary Examiner* — Wesley J Tucker
(74) *Attorney, Agent, or Firm* — Carter, DeLuca & Farrell LLP

(57) ABSTRACT

The technology of the present disclosure is capable of notifying of an implementing item which is considered necessary in a timely manner based on the target person's state and situation. A person recognition unit performs person recognition processing on the obtained captured image by using a learning model. An emotion recognition unit estimates the emotion of the person in the obtained captured image by performing emotion recognition processing on the image of the person. An activity prediction unit predicts the activity of the person by performing activity prediction processing on the obtained captured image. A situation recognition unit recognizes the target person and the situation around that person by using a learning model that has learned. An implementing item determination unit determines one or more implementing items to notify of based on the obtained estimation result and implementing item, implementation conditions, and notification destinations are associated with one another.

19 Claims, 16 Drawing Sheets

DETERMINATION BASED ON EMOTION RECOGNITION

(56) References Cited

U.S. PATENT DOCUMENTS

| | | | | |
|---|---|---|---|---|
| 12,155,665 | B2* | 11/2024 | Ainsworth | G07C 9/30 |
| 2008/0294017 | A1* | 11/2008 | Gobeyn | A61B 5/445 |
| | | | | 600/301 |
| 2013/0121591 | A1* | 5/2013 | Hill | G10L 15/1815 |
| | | | | 382/195 |
| 2014/0118225 | A1* | 5/2014 | Jerauld | A61B 5/11 |
| | | | | 345/8 |
| 2015/0061824 | A1* | 3/2015 | Suzuki | G06F 3/011 |
| | | | | 340/5.52 |
| 2018/0184959 | A1* | 7/2018 | Takahashi | A61B 5/1118 |
| 2019/0147043 | A1* | 5/2019 | Moskowitz | A61B 5/165 |
| | | | | 704/9 |
| 2021/0056826 | A1* | 2/2021 | Okubo | G06V 40/103 |
| 2022/0108104 | A1* | 4/2022 | Sha | G06V 10/82 |
| 2025/0302354 | A1* | 10/2025 | Usami | A61B 5/165 |

* cited by examiner

| IMAGE | USER | AGE | SEX |
|---|---|---|---|
| FACE IMAGE A | USER A | 30 | MALE |
| FACE IMAGE B | USER B | 29 | FEMALE |
| FACE IMAGE C | USER C | 7 | MALE |
| FACE IMAGE D | USER D | 3 | FEMALE |
| FACE IMAGE E | USER E | 70 | FEMALE |
| FACE IMAGE F | USER F | 50 | FEMALE |

FIG.5A

| IMAGE | AGE | SEX |
|---|---|---|
| FACE IMAGE A | 31 | MALE |
| FACE IMAGE B | 20 | FEMALE |
| FACE IMAGE C | 60 | MALE |
| FACE IMAGE D | 10 | FEMALE |

FIG.5B

| IMAGE | EMOTION |
|---|---|
| FACE IMAGE A | RUSHED |
| FACE IMAGE B | SAD |
| FACE IMAGE C | ENJOYING |
| FACE IMAGE D | NORMAL |
| FACE IMAGE E | DEPRESSED |

FIG.6A

| MOVING IMAGE | EMOTION |
|---|---|
| MOVING IMAGE FILE A OF A PERSON FEELING RUSHED | RUSHED |
| MOVING IMAGE FILE B OF A PERSON FEELING DEPRESSED | DEPRESSED |
| MOVING IMAGE FILE C OF A PERSON IN NORMAL STATE | NORMAL |
| MOVING IMAGE FILE D OF A PERSON ENJOYING | ENJOYING |

FIG.6B

| IMAGE | CLOTHING TYPE |
|---|---|
| CLOTHING IMAGE A | SUIT |
| CLOTHING IMAGE B | SLEEPWEAR |
| CLOTHING IMAGE C | JEANS |
| CLOTHING IMAGE D | T-SHIRT |

FIG.7A

| IMAGE | POSSESSION TYPE |
|---|---|
| POSSESSION IMAGE A | BUSINESS BAG |
| POSSESSION IMAGE B | BACKPACK |
| POSSESSION IMAGE C | HANDBAG |
| POSSESSION IMAGE D | SHOULDER BAG |

FIG.7B

| USER | CLOTHING | POSSESSION | TIME PERIOD | ACTIVITY |
|---|---|---|---|---|
| USER A | SUIT | BUSINESS BAG | MORNING | GOING TO WORK |
| USER A | SUIT | NONE | MORNING | HAVING A MEAL |
| USER A | JERSEY | NONE | NOON | GOING TO A0 CONVENIENCE STORE |
| USER A | T-SHIRT, JEANS | BACKPACK | NOON | CYCLING |
| USER A | T-SHIRT, JEANS | SHOULDER BAG | NOON | SHOPPING |

FIG.8A

| OUT TO OR FOR: | OUT TIME |
|---|---|
| OFFICE | 9 HOURS |
| CONVENIENCE STORE | 5-20 MINUTES |
| CYCLING | 2 HOURS |
| SHOPPING | 4-8 HOURS |

FIG.8B

| IMAGE INDICATING PERSON'S SITUATION | SITUATION |
|---|---|
| IMAGE OF A PERSON SLEEPING | SLEEPING |
| IMAGE OF A PERSON READING A BOOK | READING A BOOK |
| IMAGE OF A PERSON COMFORTING A CHILD | COMFORTING A CHILD |
| IMAGE OF A PERSON COOKING | COOKING |
| IMAGE OF A PERSON HAVING A MEAL | HAVING A MEAL |

FIG.9A

| IMAGE INDICATING A PLACE | PLACE TYPE |
|---|---|
| PLACE IMAGE A | DINING |
| PLACE IMAGE B | BATHROOM |
| PLACE IMAGE C | KITCHEN |
| PLACE IMAGE D | FRONT DOOR |
| PLACE IMAGE E | BEDROOM |

FIG.9B

| IMAGE | SUBJECT | STATE |
|---|---|---|
| IMAGE OF GAS STOVE TURNED ON | GAS STOVE | ON |
| IMAGE OF GAS STOVE TURNED OFF | GAS STOVE | OFF |
| IMAGE OF AIR CONDITIONING TURNED ON | AIR CONDITIONING | ON |
| IMAGE OF AIR CONDITIONING TURNED OFF | AIR CONDITIONING | OFF |
| IMAGE OF LOCK LOCKED | LOCK | ON |
| IMAGE OF LOCK UNLOCKED | LOCK | OFF |

FIG.10

| IMPLEMENTING ITEM | IMPLEMENTATION CONDITION | | | NOTIFICATION DESTINATION (SYSTEM AND/OR USER) |
|---|---|---|---|---|
| | USER'S EMOTION WHAT | USER IS GOING TO DO | SITUATION AROUND USER | |
| LOCK | ANY | GOING OUT | NO ADULT IS IN THE HOUSE OR AN ADULT IS SLEEPING | BOTH |
| TURN OFF STOVE AND GAS STOVE | ANY | GOING OUT | NO ADULT IS IN THE HOUSE OR AN ADULT IS SLEEPING | BOTH |
| TURN OFF AIR CONDITIONING | NOT IN A RUSH | GOING OUT FOR A LONG WHILE (1 HOUR OR LONGER) | NO ONE IS IN THE HOUSE | BOTH |
| PLAY ENERGIZING MUSIC | DEPRESSED | HAVING A MEAL | NO ONE IS SLEEPING | SYSTEM |
| TURN ON AIR CONDITIONING | NOT IN A RUSH | WAKING UP IN MORNING | ANY | SYSTEM |
| PREPARE LUNCH | NOT SAD NOT DEPRESSED | WAKING UP IN MORNING | CHILD IS IN THE HOUSE | USER |

FIG.11

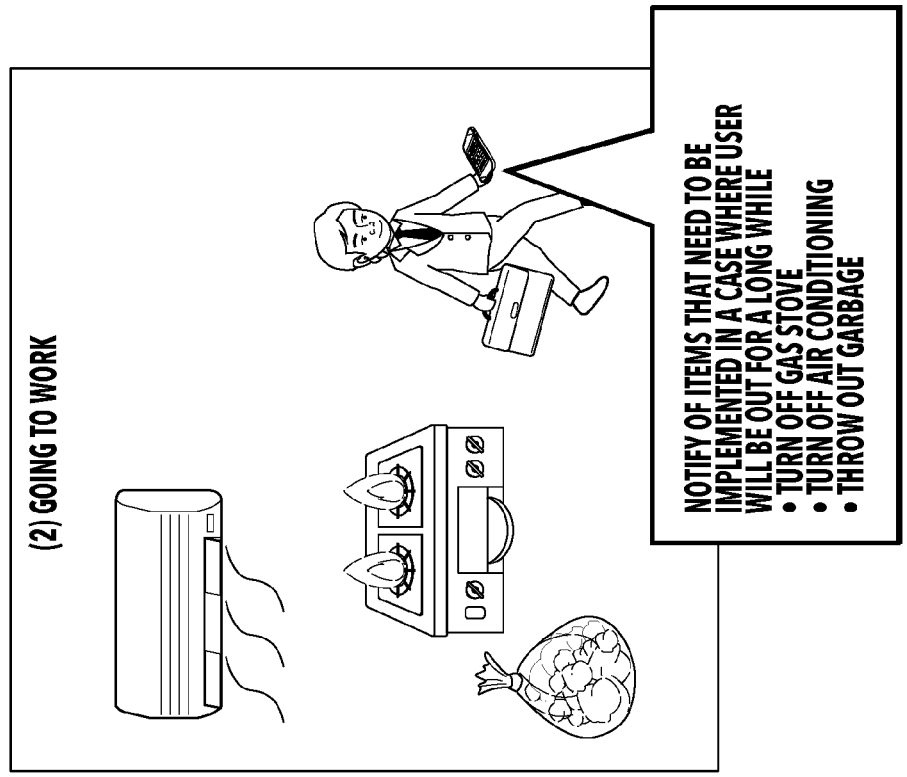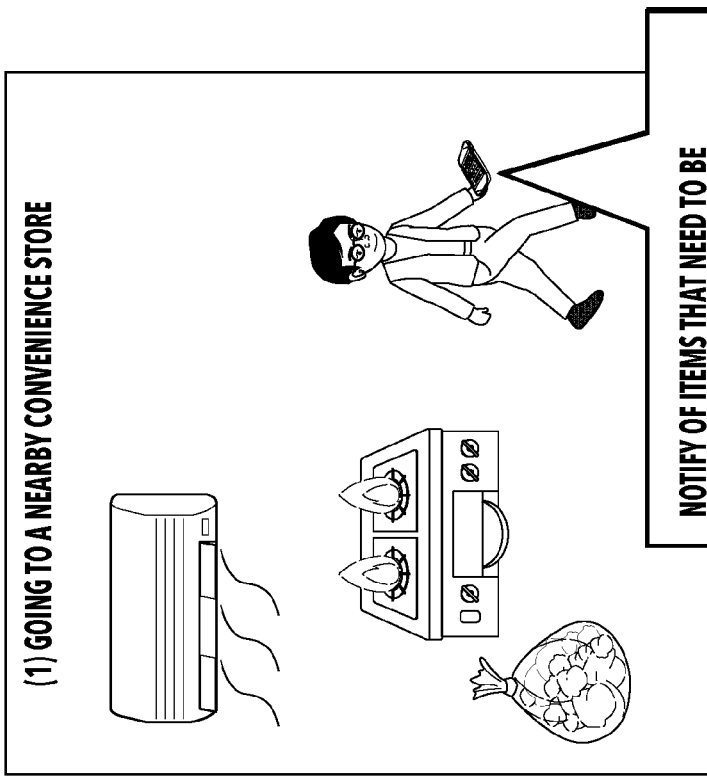
FIG.13

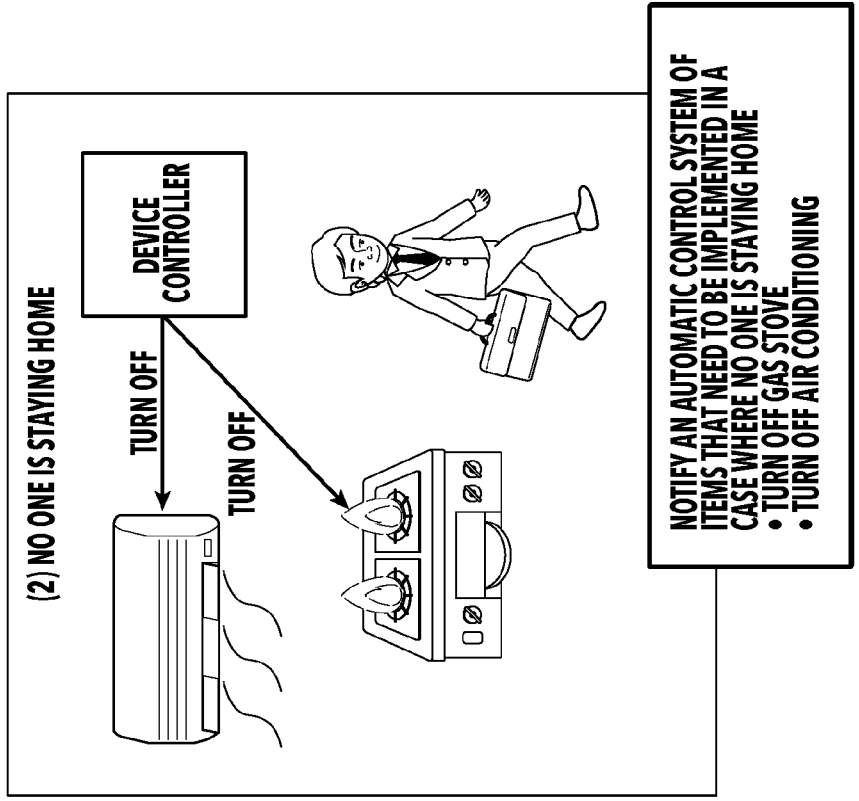
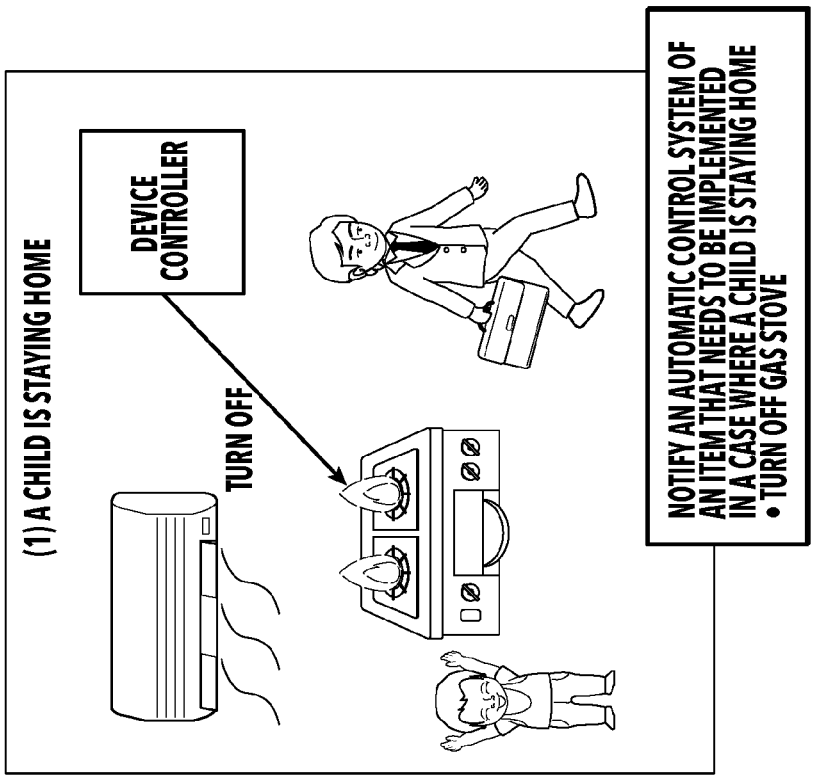
FIG.16

INFORMATION PROCESSING APPARATUS, INFORMATION PROCESSING METHOD, NOTIFICATION SYSTEM, AND STORAGE MEDIUM

BACKGROUND

Field

The present disclosure relates to an information processing technique for livelihood support notification.

Description of the Related Art

Heretofore, apparatuses which detect that a user has forgotten to perform an activity and notify the user of that fact have been considered. In Japanese Patent Laid-Open No. 2010-207537, living activities performed by a target user on a day-to-day basis and the time periods in which these living activities are performed are registered in advance and, in a case where the user fails to perform any of the registered living activities in the registered time period, that failure is detected and the user is notified of it. Thus, by receiving the notification about the living activity which the user should perform in the pre-registered time period, the user can avoid forgetting to perform the activity.

Note that not all of the user's living activities are performed as registered in advance. For example, the user sometimes performs an unscheduled living activity, such as unexpectedly going to a convenience store or having to suddenly go out due to an unexpected event. However, in Japanese Patent Laid-Open No. 2010-207537, each implementing item to be notified of is registered in association with a time period. This makes it impossible to identify and notify of an implementing item for the user's unscheduled living activity. Also, implementing items are registered and determined in advance. Hence, even in a case where the user is in a rush or a person is staying home, the user may be notified of an item that should not necessarily be implemented at that time. This may annoy the user.

In view of the above, an object of the present disclosure is to notify of an implementing item which is considered necessary in a timely manner based on the target person's state and situation.

SUMMARY

The present disclosure provides an information processing apparatus including: an estimation unit that analyzes a captured image obtained by image capture with an image capturing apparatus, and estimates at least one of registration information for individually identifying information indicating an emotion of the target person; and a notification unit that sends notification of an implementing item satisfying a predetermined condition among pre-registered implementing items based on the estimation by the estimation unit.

Further features of the present disclosure will become apparent from the following description of exemplary embodiments with reference to the attached drawings.

BRIEF DESCRIPTION OF THE DRAWINGS

FIG. 5A is a diagram illustrating an example of person recognition learning data;

FIG. 5B is a diagram illustrating an example of the person recognition learning data;

FIG. 6A is a diagram illustrating an example of emotion recognition learning data;

FIG. 6B is a diagram illustrating an example of the emotion recognition learning data;

FIG. 7A is a diagram illustrating an example of activity prediction learning data (clothing recognition unit);

FIG. 7B is a diagram illustrating an example of the activity prediction learning data (clothing recognition unit);

FIG. 8A is a diagram illustrating an example of the activity prediction learning data (activity prediction unit);

FIG. 8B is a diagram illustrating an example of the activity prediction learning data (activity prediction unit);

FIG. 9A is a diagram illustrating an example of situation learning data (the states or surrounding persons or places);

FIG. 9B is a diagram illustrating an example of the situation learning data (the states or surrounding persons or places);

FIG. 10 is a diagram illustrating an example of situation learning data (the states of a gas stove, a home electric appliance, a lock, etc.);

FIG. 11 is a diagram illustrating an example of implementing item data;

FIG. 13 is a diagram illustrating implementation conditions based on the result of activity prediction;

FIG. 16 is a diagram illustrating implementation conditions for the device controller based on the result of situation recognition.

DESCRIPTION OF THE EMBODIMENTS

Figure 1:
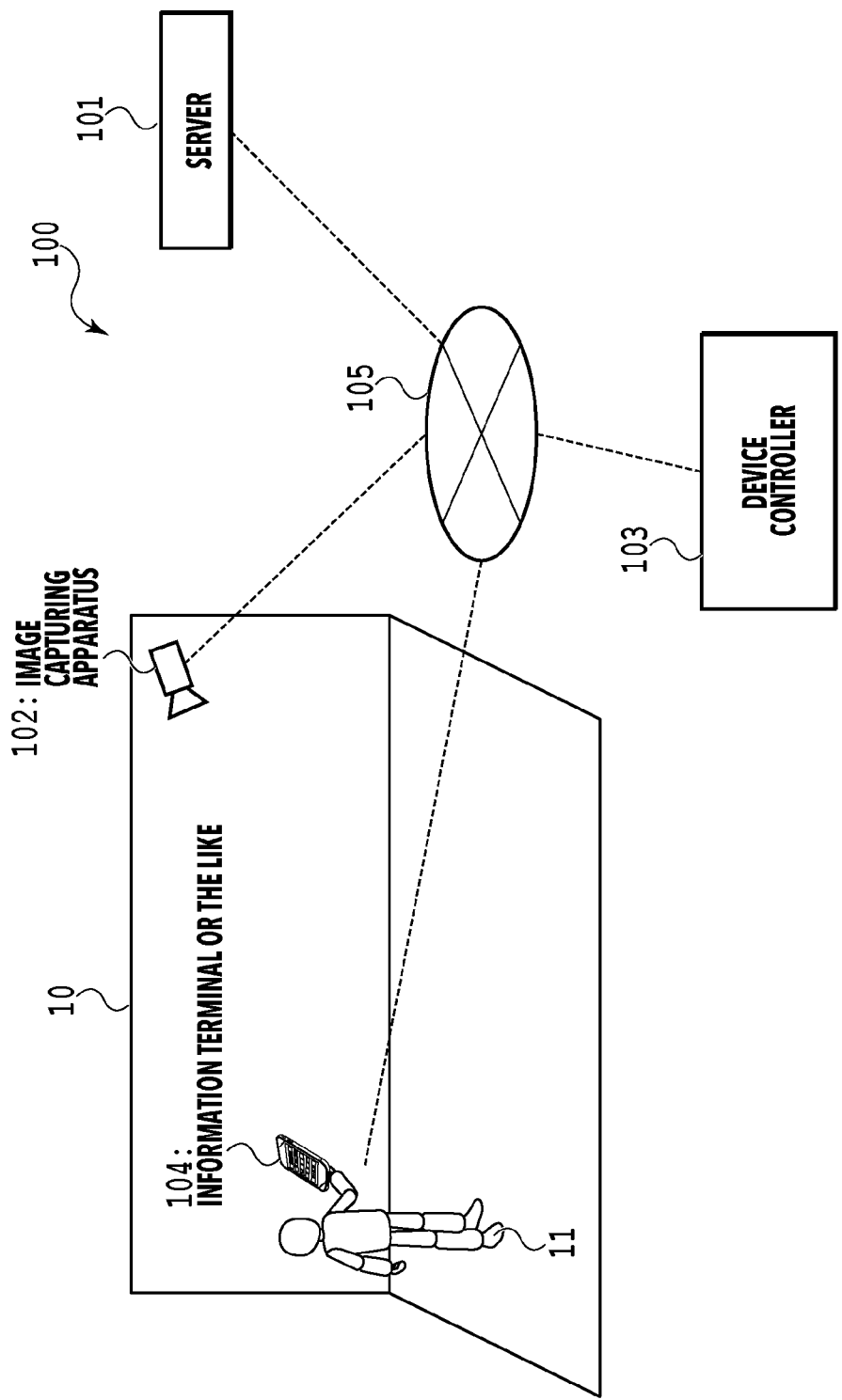
FIG. 1 is a schematic diagram illustrating a configuration of a notification system.

FIG. 1 is a schematic diagram illustrating a configuration of a notification system. A notification system 100 includes a server 101, an image capturing apparatus 102, a device controller 103, an information terminal 104, and a network 105. The image capturing apparatus 102 has a communication function and is installed so as to be capable of looking over the inside of a room 10 in which a target person 11 to be monitored by the notification system lives. The device controller 103 is a control apparatus, which is also called a smart home electric appliance controller, capable of controlling existing home appliances in response to receiving a notification from the server 101. The information terminal 104 is an information terminal such as a smartphone or a smart speaker or smart display placed in the room 10 each of which can receive notifications from the server 101, and is an information terminal having a communication function that enables reception of notifications from the server 101. Incidentally, the device controller 103 and the information terminal 104 each represent an example of an apparatus including a reception apparatus that receives notifications from the server 101, and only the device controller 103 or the information terminal 104 may be provided. Alternatively, another apparatus that receives notifications from the server 101 may be provided in addition to the device controller 103 and the information terminal 104.

In the example illustrated in FIG. 1, the server 101 obtains a captured image obtained by the image capturing apparatus 102 through the network 105, and notifies the device controller 103 and the information terminal 104 of one or more implementing items determined based on the obtained captured image.

Figure 2:
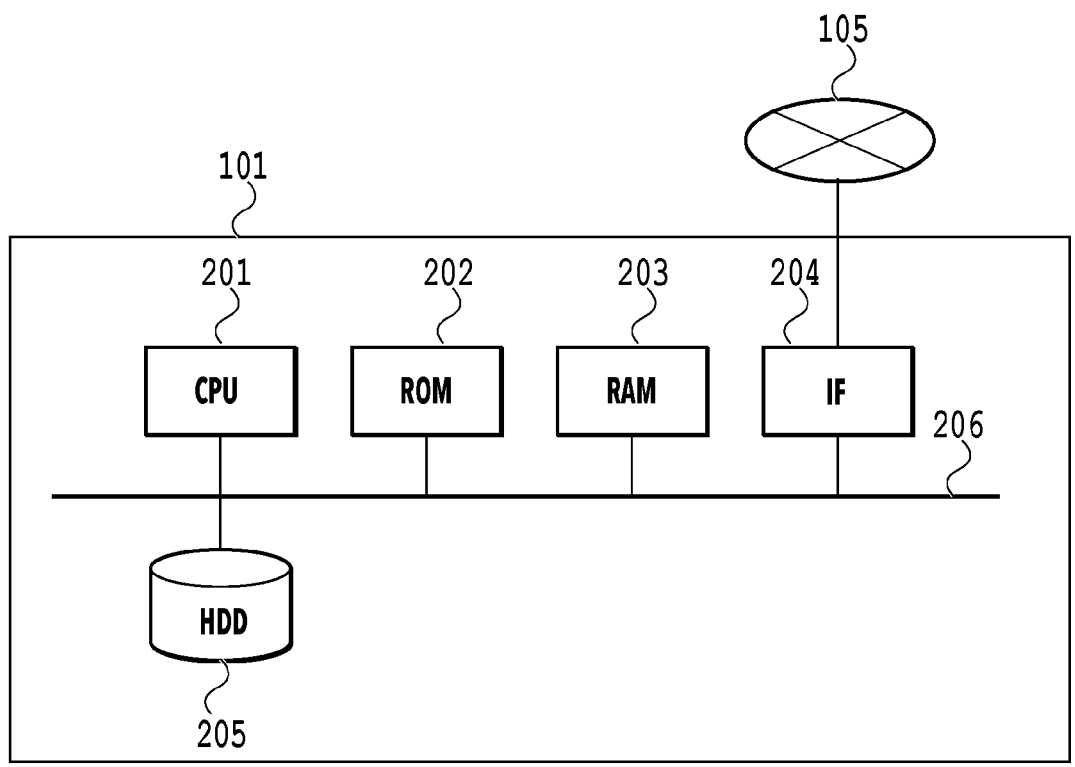
FIG. 2 is a diagram illustrating a configuration of a notification apparatus in an embodiment.

FIG. 2 is a diagram illustrating an example of the hardware configuration of the server 101. The server 101 is an information processing apparatus having a central processing unit (CPU) 201, a read-only memory (ROM) 202, a random access memory (RAM) 203, an interface (I/F) 204, and a hard disk drive (HDD) 205, and each component is connected by a bus 206. The CPU 201, for example, controls the operation of each component in the server 101 according to contents in the ROM 202 and executes a program loaded to the RAM 203. The ROM 202 is a read-only memory storing a boot program, firmware, various processing programs and various pieces of data for implementing the processing to be described later. The RAM 203 is a work memory to temporarily store programs and data in order for the CPU 201 to perform processing, and various processing programs and data are loaded to the RAM 203 by the CPU 201. The I/F 204 is an interface for communicating with external apparatuses such as network devices and universal serial bus (USB) devices, and performs data communication through the network and data exchange with the external apparatuses. The HDD 205 is a secondary storage region to store various pieces of data, and may be configured to be provided in the server 101 or in an external storage server connected to the network.

Figure 3:
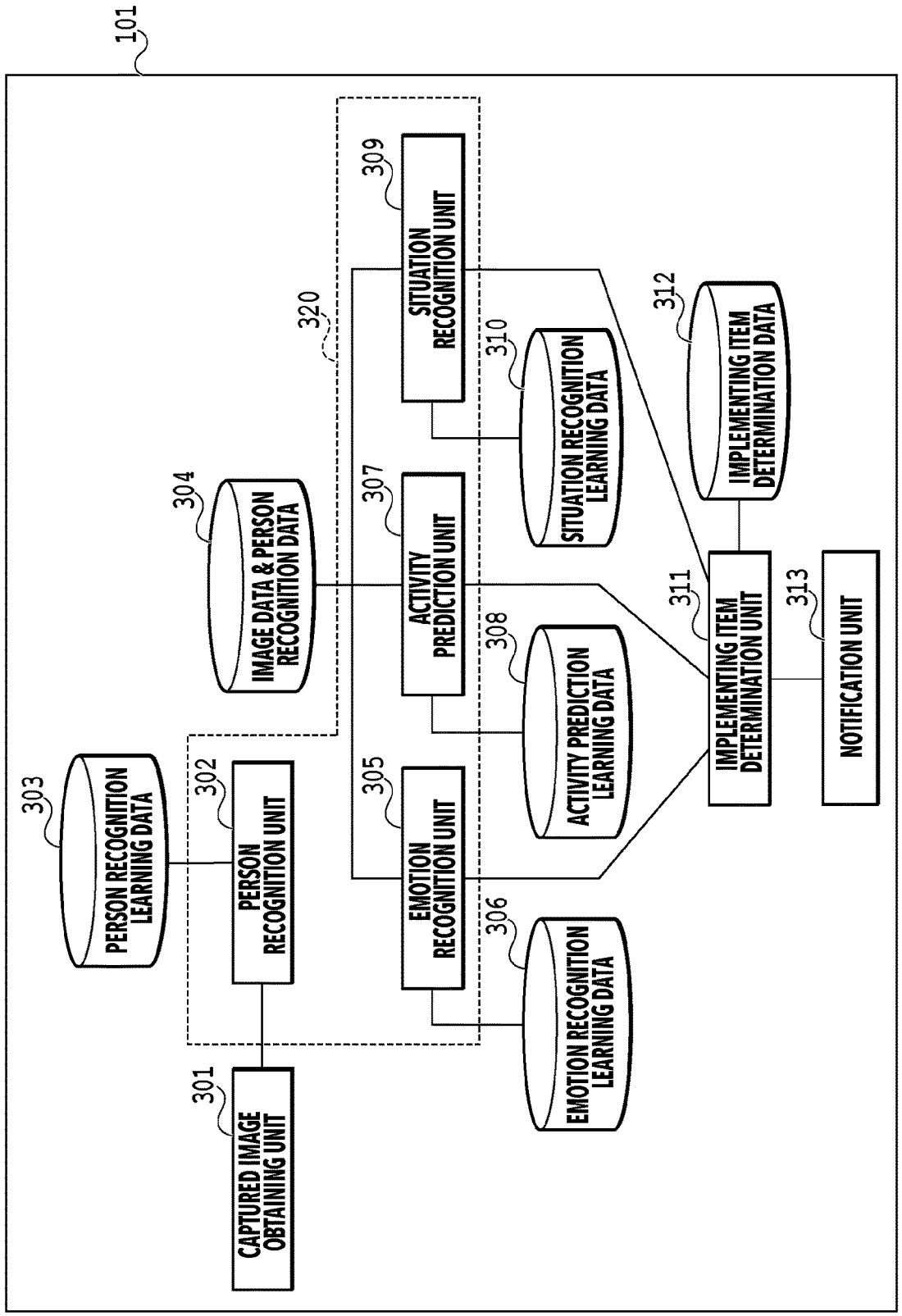
FIG. 3 is a software logic configuration of the notification system in the embodiment.

FIG. 3 is a diagram illustrating an example of the software configuration of the server 101 in Embodiment 1. Details of the process by each unit and data used in each process will be described with reference to the flowchart to be mentioned later.

A captured image obtaining unit 301 obtains a captured image from the image capturing apparatus 102 through the network 105.

An estimation unit 320 includes a person recognition unit 302, an emotion recognition unit 305, an activity prediction unit 307, and a situation recognition unit 309, and analyzes the captured image to estimate the emotion and attributes of the target person 11, an activity which the target person 11 is expected to perform, and the situation around the target person 11.

The person recognition unit 302 obtains a captured image from captured image obtaining unit 301, recognizes a person appearing in the obtained captured image by using person recognition learning data 303, and stores the resulting person recognition data in the captured image data 304 in association with the captured image. Here, associating the person recognition data with the captured image means, for example, making identifiable an image region in the captured image corresponding to the person recognized from the captured image and associating each image region corresponding to the person with the person's registration information and attribute information.

The emotion recognition unit 305 recognizes the emotion of the person recognized by the person recognition unit 302 by using the captured image data 304 including the person recognition data and emotion recognition learning data 306.

The activity prediction unit 307 predicts the activity of the person recognized by the person recognition unit 302 by using the captured image data 304 including the person recognition data and activity prediction learning data 308.

The situation recognition unit 309 recognizes the situation around the target person 11 by using the captured image data 304 and situation recognition learning data 310.

In the present embodiment, the estimation unit 320 is configured to include the person recognition unit 302, the emotion recognition unit 305, the activity prediction unit 307, and the situation recognition unit 309 but does not necessarily have to include all of them. It suffices that the estimation unit 320 include at least the person recognition unit 302 among them.

An implementing item determination unit 311 determines one or more implementing items which the target person 11 should implement out of implementing item determination data 312 registered in advance as items which the target person 11 should implement, based on data obtained from the emotion recognition unit 305, the activity prediction unit 307, and the situation recognition unit 309. The implementing items are items registered in advance such as living activities and operations on appliances to be performed by the target person 11.

Figure 12:
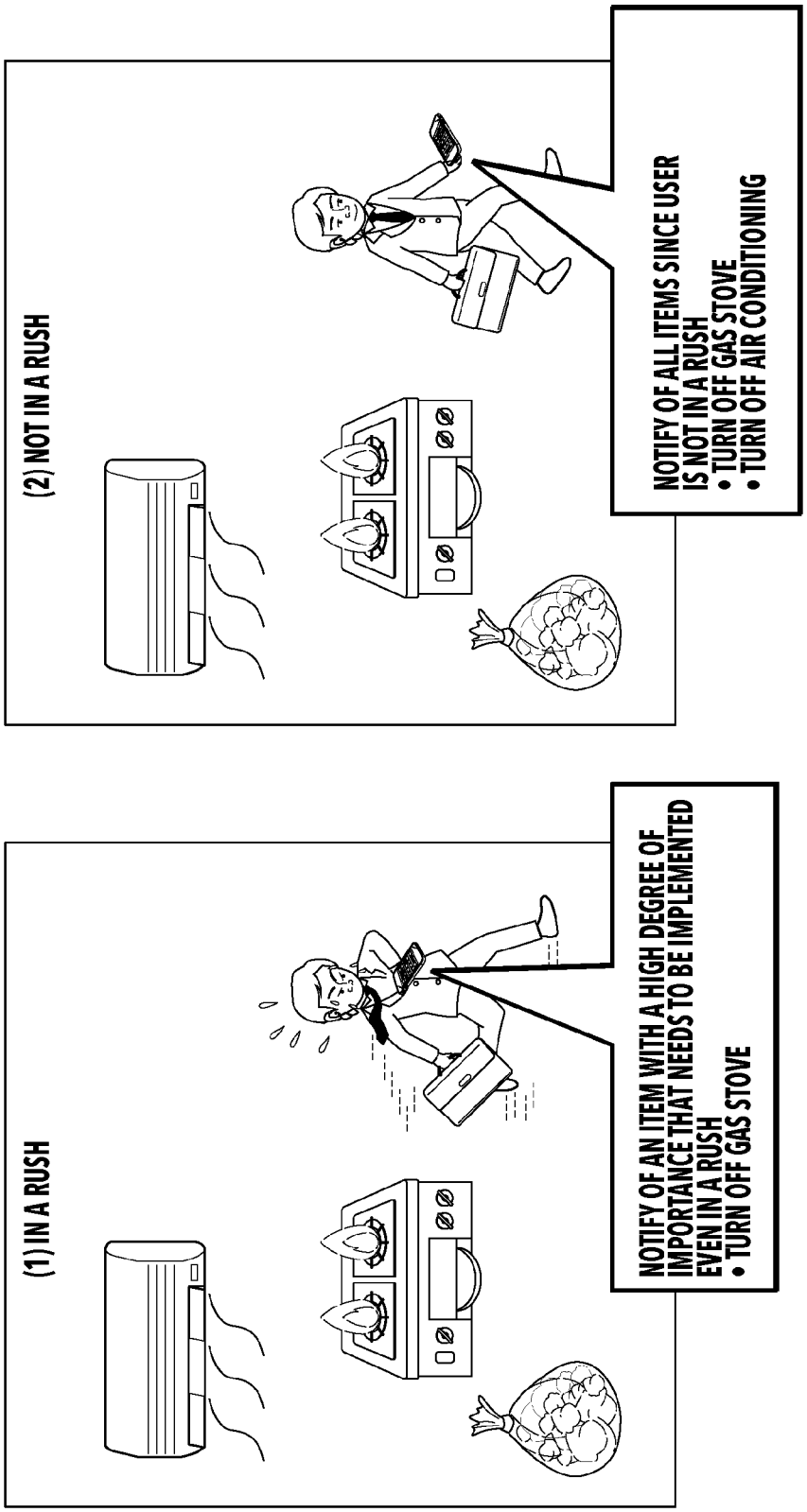
FIG. 12 is a diagram illustrating implementation conditions based on the result of emotion recognition.

FIG. 12 illustrates examples of the determination of one or more implementing items based on emotion recognition. In a case where the target person is recognized as being in a rush, only turning off the gas stove is determined as the implementing item to notify of since it is desirable to minimize the number of implementing items to notify of On the other hand, in a case where the target person is recognized as being not in a rush, turning off the air conditioning and throwing out garbage as well as turning off the gas stove, which is an essential implementing item, are determined as the implementing items to notify of.

FIG. 13 illustrates an example of the determination of implementing items based on activity prediction. In a case where the target person is recognized as going out for a short while to go to a nearby convenience store, turning off the gas stove and throwing out garbage are determined as the implementing items to notify of. On the other hand, in a case where the target person is recognized as going out for a long while to go to work, turning off the gas stove and throwing out garbage as well as turning off the air conditioning are determined as the implementing items to notify of.

Figure 14:
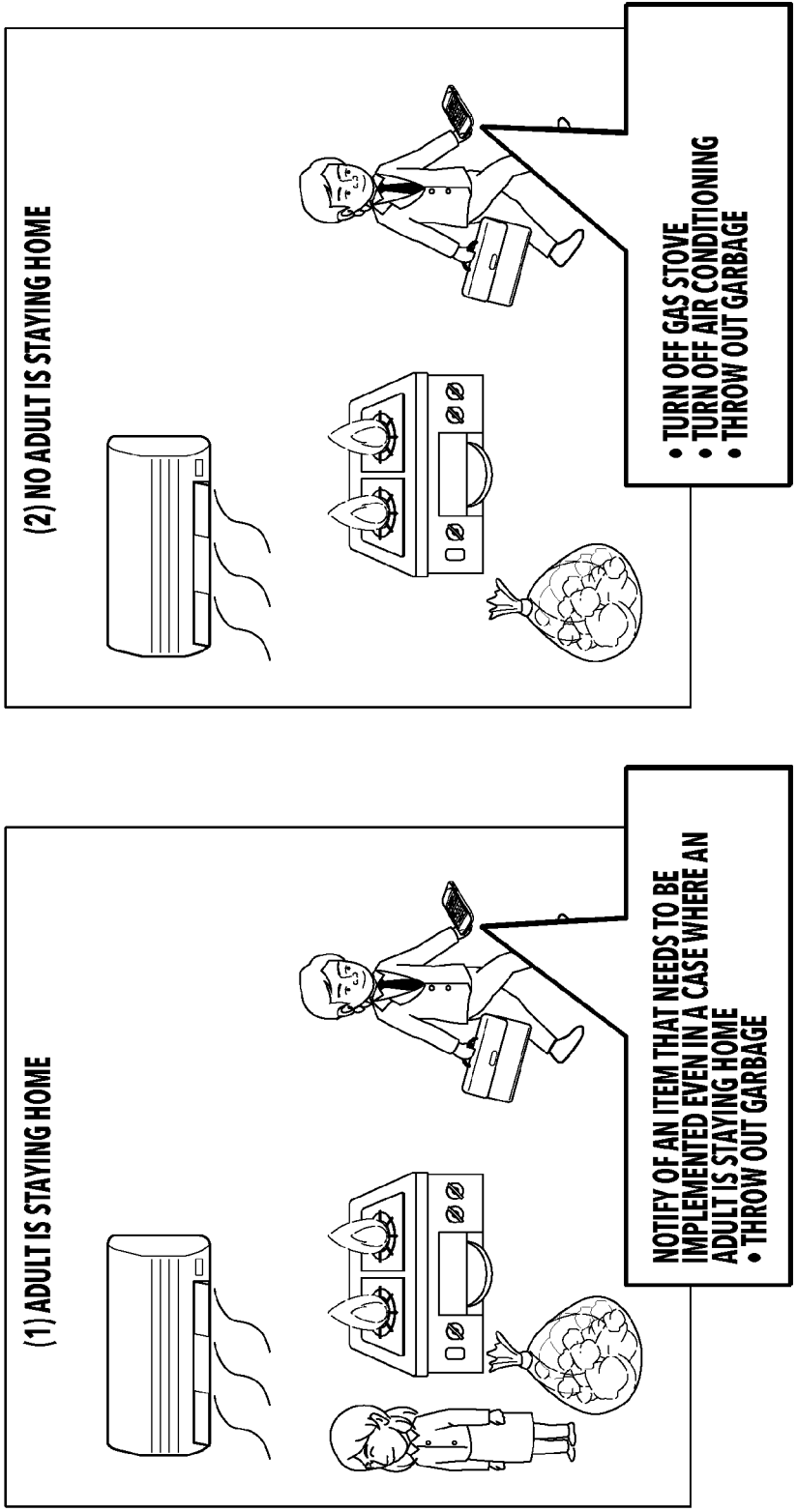
FIG. 14 is a diagram illustrating implementation conditions based on the result of situation recognition.

FIG. 14 illustrates examples of the determination of one or more implementing items based on situation recognition. In a case where an adult is recognized as staying home when the target person is leaving, turning off the gas stove is not determined as an essential implementing item, and only throwing out garbage is determined as the implementing item to notify of. On the other hand, in a case where no adult is recognized as staying home when the target person is leaving, turning off the gas stove, turning off the air conditioning, and throwing out garbage are determined as the implementing items to notify of.

As described above, the implementing item determination unit 311 can change the implementing items to notify of according to the results of emotion recognition, activity prediction, and situation recognition, and determine the desirable implementing items to notify of according to the target person's situation at the moment. Also, the implementing item determination unit 311 can determine the implementing items to notify of in a more specific manner by combining the results of emotion recognition, activity prediction, and situation recognition, as will be described later.

Figure 15:
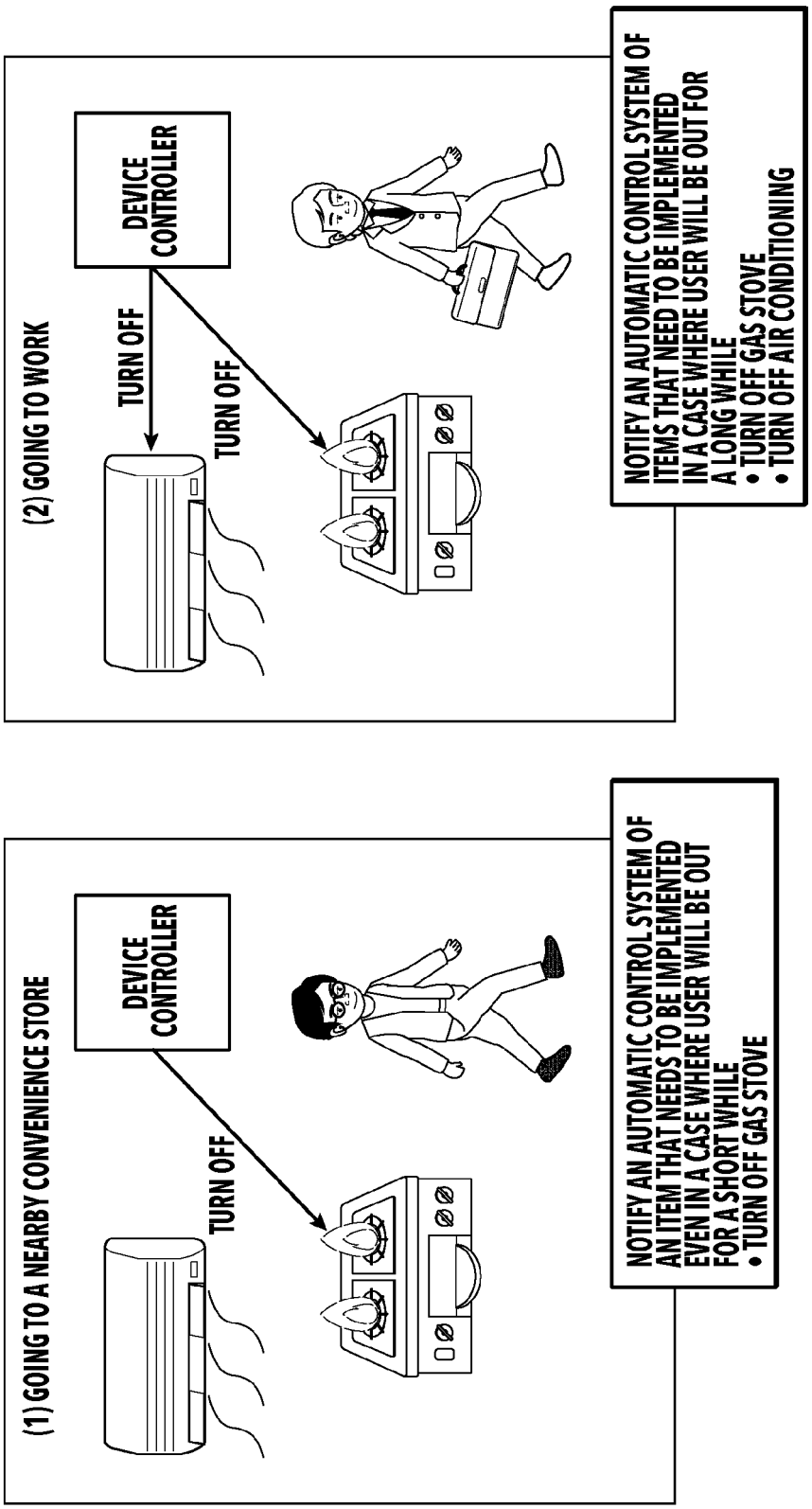
FIG. 15 is a diagram illustrating implementation conditions for a device controller based on the result of activity prediction.

A notification unit 313 notifies the information terminal 104 or the like of the target person 11 of the one or more implementing items obtained by the determination by the implementing item determination unit 311. Instead of directly notifying the information terminal 104 of the target person 11 of the implementing items, the notification unit 313 may cause another external apparatus to make the notification. Also, the notification destination may be a pre-registered information terminal other than the information terminal 104 of the target person 11, e.g., an information terminal of a family member of the target person 11 or the like, instead of the information terminal 104 of the target person 11. Further, the notification may be not only one that informs a person of the implementing items by means of characters or speech but one that causes the device controller 103 or the like to issue an instruction to perform designated appliance operations. FIGS. 15 and 16 illustrate examples of controlling one or more appliances by issuing a notification from the server 101 to the device controller 103. In the examples illustrated in FIGS. 15 and 16, the notification unit 313 of the server 101 notifies the device controller 103 of an implementing item to be implemented on the gas stove and/or the air conditioning, and the device controller 103 operates the gas stove and/or the air conditioning according to the implementing item which the device controller 103 has been notified of. In the example illustrated in FIG. 15, the appliances to be turned off by the device controller 103 are changed based on the length of time for which the target person is expected to be out. In the example illustrated in FIG. 16, the appliances to be turned off by the device controller 103 are changed based on whether a child or children are staying home.

Figure 4:
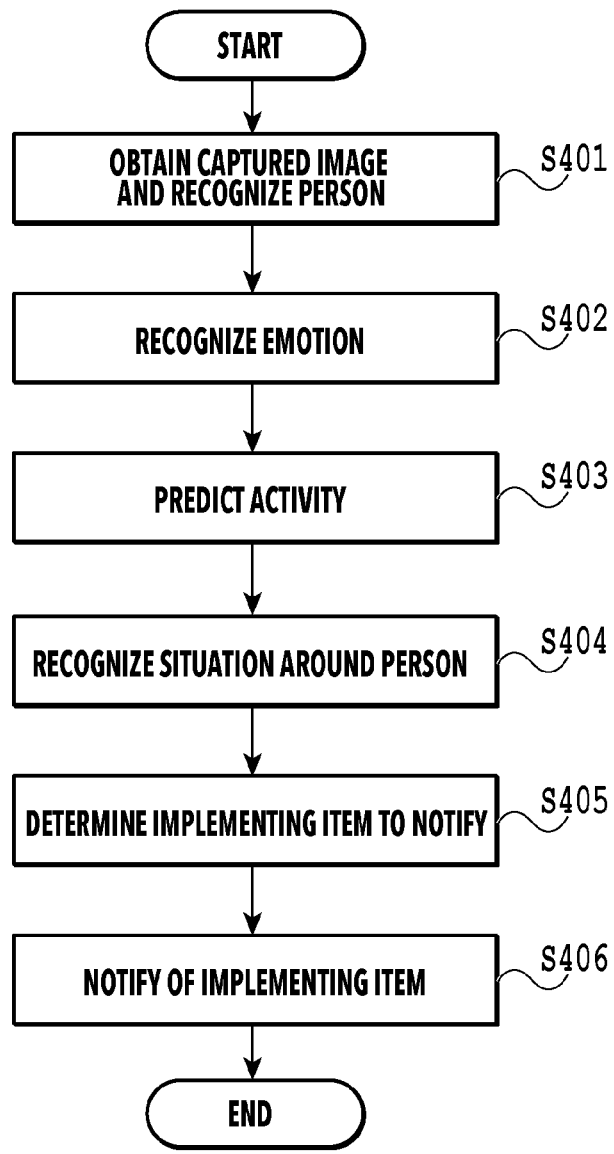
FIG. 4 is a flowchart of the entirety of processing in the present embodiment.

FIG. 4 is a flowchart illustrating processing performed in the entire notification system in Embodiment 1.

In S401, the person recognition unit 302 obtains a captured image from the image capturing apparatus 102, and performs person recognition processing on the obtained captured image by using a learning model that has learned using the person recognition learning data 303 illustrated in FIGS. 5A and 5B. The person recognition learning data is learning data in which, as illustrated in FIG. 5A, face images of persons registered in advance and pieces of registration information for individually identifying users, such as the persons' names and ages, are associated with one another, and is learning data indicating the correspondence relationship between these. This learning data includes, for example, data of a face image A of a userA using the system as well as the user's age and sex. In this way, a registered user and registration information on the user can be recognized from a captured image. FIG. 5B is learning data in which face images of unregistered persons, such as guests, and pieces of attribute information such as age and sex are associated with one another. This learning data includes, for example, a face image A of a 31-year-old male, a face image B of a 20-year-old female, and so on. In this way, it is possible to recognize persons who could not be recognized with the learning data illustrated in FIG. 5A, and estimate pieces of attribute information such as age and sex. Incidentally, the pieces of registration information and attribute information may be stored as metadata of the face images.

In S402, the emotion recognition unit 305 estimates the emotion of the person in the captured image obtained in S401 by performing emotion recognition processing on the image of the person with a learning model that has learned with the emotion recognition learning data 306 as illustrated in FIGS. 6A and 6B. It suffices that the emotion recognition learning data include at least one of the data illustrated in FIG. 6A or the data illustrated in FIG. 6B. The emotion recognition learning data illustrated in FIG. 6A is learning data in which pieces of information indicating emotions and face images of persons are associated with each other, and is learning data indicating the correspondence relationship between these. It includes, for example, a face image A of a person feeling rushed, a face image B of a person feeling sad, and so on. With a learning model that has learned using these pieces of data, the emotion of a person can be recognized from the facial expression. The emotion recognition learning data illustrated in FIG. 6B is learning data in which pieces of information indicating emotions and moving images indicating the behaviors of persons having those emotions are associated with each other, and is learning data indicating the correspondence relationship between these. It includes, for example, a moving image file A in which the behavior of a person feeling rushed is recorded, a moving image file B in which the behavior of a person feeling depressed is recorded, and so on. With a learning model that has learned using these pieces of data, the emotion of the person in the captured image obtained from the image capturing apparatus 102 in S401 can be recognized from the captured image. Incidentally, each piece of behavior data associated with an emotion is not limited to a moving image, and may be the person's motion information or biological information detected by a motion sensor or the like mounted in the information terminal 104 of the person, such as a smartwatch or a smartphone. In a case of using data thus detected by the information terminal 104, the emotion recognition unit 305 may obtain the data from the information terminal 104.

In S403, the activity prediction unit 307 predicts the activity of the user by performing activity prediction processing on the captured image obtained in S401 with a learning model that has learned with the activity prediction learning data 308 as illustrated in FIGS. 7A, 7B, 8A, and 8B. In the activity prediction learning data 308, pieces of clothing type information and pieces of clothing image data are stored in association with one another, like the table illustrated in FIG. 7A. It includes, for example, an image A for a suit, an image B for a sleepwear, an image C for jeans, and so on. With a learning model that has learned with these pieces of data, the clothing of the person can be recognized from the captured image obtained from the image capturing apparatus 102. In the activity prediction learning data 308, pieces of possession type information and pieces of possession image data are also stored in association with one another, like the table illustrated in FIG. 7B. It includes, for example, an image A of a business bag, an image B of a backpack, and so on. In this way, the target user's possession can be recognized. The table illustrated in FIG. 8A includes learning data indicating combinations of a user, clothing, a possession, and an image capturing time period and respective activities which the user is likely to perform. For example, in a case where the clothing and possession of a user A are a suit and a business bag, respectively, and the image capturing time period is morning, a likely activity is going to work. In this way, it is possible to predict the activity which the target user is likely to perform. FIG. 8B includes data indicating a predicted out time for each activity outside home. For example, the out time is 9 hours in a case the activity outside home is working, and is 2 hours in a case where the activity outside home is cycling. In this way, the out time can be predicted from the image of the user obtained in S401 based on the activity prediction learning data 308 as illustrated in FIGS. 7A, 7B, 8A, and 8B. Incidentally, this out time data may be updated by obtaining the time from when the user leaves home to when the user comes home each time the user goes out.

In S404, the situation recognition unit 309 recognizes the target person 11 and the situation around that person by using a learning model that has learned with the situation recognition learning data 310 as illustrated in FIGS. 9A, 9B and 10. In the situation recognition learning data 310, actions performed by persons, and pieces of image data of the persons performing these actions are associated with one another, like the table illustrated in FIG. 9A. Examples of the images of persons performing actions include an image of a person sleeping, an image of a person reading a book, and so on. With a learning model that has learned with these pieces of data, what the person in the captured image was doing at the time of the image capture can be estimated based on the captured image. Also, in the situation recognition learning data 310, pieces of place type information and pieces of image data indicating those places are stored in association with one another, like the table illustrated in FIG. 9B. Examples of the images indicating places include an image A of a dining, an image B of a bathroom, an image C of a kitchen, and so on. In this way, where the person in the captured image was at the time of the image capture can be estimated based on the captured image.

The situation recognition learning data 310 also includes images of various devices such as the home electric appliances and the gas stove within the image capturing range of the image capturing apparatus 102 with the power or switch turned on and with the power or switch turned off, and images of fittings such as windows and doors in a locked state and in an unlocked state, like the table illustrated in FIG. 10. Examples of the images include an image of the gas stove in a lighted state (the switch is turned on), an image of the gas stove in an unlighted state (the switch is turned off), and so on. The examples also include an image of the air conditioning in operation (the switch is turned on), an image of the air conditioning stopped (the switched is turned off), an image of a fitting such as a window or a door locked, and an image of the fitting unlocked. With a learning model that has learned with these pieces of data, whether the powers or switches of the home electric appliances, the gas stove, and so on are turned on or off, and whether the fittings are locked or unlocked can be estimated from the captured image. Note that the operation information on appliances such as the home electric appliances and the gas stove as above may be obtained from the device controller 103, instead of being estimated from the captured image. The situation recognition learning data 310 also includes pieces of image data of the fittings such as the windows and the doors locked and of the fittings unlocked. By learning with such situation recognition learning data 310, the situation recognition unit 309 can estimate whether the appliances are turned on or off and whether the fittings are locked or unlocked.

In S405, the implementing item determination unit 311 determines the one or more implementing items to notify of based on the estimation results obtained in S402, S403, and S404 described above and the implementing item determination data 312 as illustrated in FIG. 11, in which implementing items, implementation conditions, and notification destinations are associated with one another. FIG. 11 includes an implementation condition and a notification destination for each implementing item. For example, with an implementing item "Turn off the air conditioning", a notification destination "Both" (the system and the user) is notified of the implementing item in a case of satisfying a predetermined implementation condition "the emotion of the user is rushed, the user will be out for a long while, and no one will be in the monitoring target room 10." Thus, by determining a condition which the estimation results obtained in S402, S403, and S404 described above satisfy, the implementing item and the notification destination can be determined based on the determined condition. Also, other parameters such as the degree of importance and the frequency of notification may be added to the data in FIG. 11, and the frequency of notification and the like may be set according to the degree of importance. In the present embodiment, the implementing item determination unit 311 uses all pieces of data obtained in S402, S403, and S404. However, it suffices that the implementing item determination unit 311 use at least one of those pieces of data.

The implementing item determination data 312 may be updated based on a feedback or response given by the user in response being notified of one or more implementing items. There is a case where, for example, the user causes the air conditioning to operate immediately after the device controller 103 is notified of the implementing item "Turn off the air conditioning" based on the determined implementation condition and stops the air conditioning. In this case, the implementing item corresponding to the determined implementation condition may be updated to "Turn on the air conditioning" from "Turn off the air conditioning". Alternatively, in a case where, for example, the user is notified of the implementing item "Turn off the air conditioning" based on the determined implementation condition and returns a response indicating that it is not necessary to turn off the air conditioning, the implementing item corresponding to the determined implementation condition may be updated to "Turn on the air conditioning" from "Turn off the air conditioning".

In S406, in a case where the user is the notification destination, the notification unit 313 sends the one or more implementing items obtained in S405 to the notification destination's information terminal 104. In a case the notification destination is the system, the notification unit 313 sends the implementing items to the device controller 103. Incidentally, the user or the system may be the only notification destination. Also, the states of the appliances, i.e., whether the switches of the home electric appliances, the gas stove, and so on are turned on or off, have been recognized in the process of S404. Thus, in a case where the notification destination is the information terminal 104, it may be notified of the implementing items as well as the result of determination of whether the implementing items have already been implemented. Examples include "Turn off the air conditioning: done; Turn off the stove: not yet", and the like.

In the present embodiment, the configuration is such that the emotion recognition in S402, the activity prediction in S403, and the situation recognition in S404 are all performed. However, not all of S402 to S404 have to be performed, and it suffices that at least one of S402 to S404 be performed. That is, one or two of S402 to S404 may be omitted.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the present disclosure, it is possible to notify of an implementing item which is considered necessary in a timely manner based on the target person's state and situation.

This application claims the benefit of Japanese Patent Application No. 2022-098687 filed Jun. 20, 2022, which is hereby incorporated by reference wherein in its entirety.

The invention claimed is:

1. An information processing apparatus comprising:
one or more processors;
one or more memories coupled to the one or more processors storing instructions that, when executed by the one or more processors, cause the one or more processors to function as:
  an estimation unit that analyzes a captured image obtained by image capture with an image capturing apparatus, and estimates information indicating an emotion of the target person; and
  a notification unit that sends notification of an implementing item satisfying a condition among pre-registered implementing items based on the estimation by the estimation unit, the implementing item being a pre-registered living activity which the target person performs,
wherein the estimation unit estimates the activity which the target person is expected to perform based on at least one of clothing or a possession of the target person recognized from the captured image.

2. The information processing apparatus according to claim 1, wherein the estimation unit further estimates at least one of
registration information for individually identifying at least a target person appearing in the captured image,
attribute information indicating an attribute of the target person, and
information indicating an activity which the target person is expected to perform.

3. The information processing apparatus according to claim 1, wherein the registration information includes identification information individually identifying the target person, age, and sex.

4. The information processing apparatus according to claim 1, wherein the attribute information includes age and sex.

5. The information processing apparatus according to claim 1, wherein the implementing item includes a pre-registered operation on an appliance to be performed by the target person or by an external apparatus being a notification destination to be notified by the notification unit.

6. An information processing apparatus comprising:
one or more processors;
one or more memories coupled to the one or more processors storing instructions that, when executed by the one or more processors, cause the one or more processors to function as:
  an estimation unit that analyzes a captured image obtained by image capture with an image capturing apparatus, and estimates information indicating an emotion of the target person; and
  a notification unit that sends notification of an implementing item satisfying a condition among pre-registered implementing items based on the estimation by the estimation unit, the implementing item being a pre-registered living activity which the target person performs,
wherein the estimation unit further estimates whether a switch of an appliance recognized from the captured image and located within an image capturing range of the image capturing apparatus is turned on or off or whether a fitting recognized from the captured image and provided within the image capturing range of the image capturing apparatus is locked or unlocked.

7. The information processing apparatus according to claim 1, wherein the notification unit further determines whether the implementing item has already been implemented based on the result of the estimation by the estimation unit, and includes information indicating whether the implementing item has already been implemented in the notification.

8. The information processing apparatus according to claim 1, wherein
the estimation unit includes an emotion recognition unit that has learned a correspondence relationship between a face image of a person and information indicating an emotion corresponding to the face image, and
the emotion recognition unit recognizes the emotion of the target person based on an image region in the captured image corresponding to the target person.

9. The information processing apparatus according to claim 2, wherein
the estimation unit includes an activity prediction unit that has learned a correspondence relationship between an image of a thing which a person wears or puts on and information indicating a type of the thing which the person wears or puts on, an image capturing time period, and an activity which the person performs, and
the activity prediction unit predicts an activity which the person appearing in the captured image is going to perform based on the image capturing time period of the captured image and an image region in the captured image corresponding to the target person.

10. The information processing apparatus according to claim 1, wherein
the estimation unit includes a situation recognition unit that has learned a correspondence relationship between an image of a person and information indicating a situation of the person, and the situation recognition unit recognizes a situation of the target person based on an image region in the captured image corresponding to the target person.

11. The information processing apparatus according to claim 9, wherein the situation recognition unit further learns a correspondence relationship between an image of a place and information on a type of the place, and recognizes a situation around the target person based on the captured image.

12. The information processing apparatus according to claim 1, wherein the notification unit sets a degree of importance and a frequency of notification for each of pieces of information indicating a pre-registered activity indicated in the notification, and sets the frequency of notification based on the degree of importance.

13. The information processing apparatus according to claim 1, wherein the notification unit updates a content of the notification based on a response to the notification from a user.

14. The information processing apparatus according to claim 1, wherein the notification unit sends the notification to an information terminal of the target person.

15. The information processing apparatus according to claim 1, wherein the notification unit sends the notification to a device controller that performs a designated operation on an appliance designated in the implementing item.

16. The information processing apparatus according to claim 1, wherein the estimation unit analyzes motion information or biological information of the target person obtained from an information terminal of the target person in addition to the captured image.

17. A notification system comprising:
an image capturing apparatus;
an information processing apparatus that obtains a captured image obtained by image capture with an image capturing apparatus, the information processing apparatus comprising:
one or more processors;
one or more memories coupled to the one or more processors storing instructions that, when executed by the one or more processors, cause the one or more processors to function as an estimation unit that analyzes a captured image obtained by image capture with an image capturing apparatus, and estimates information indicating an emotion of the target person; and
a notification unit that sends notification of an implementing item satisfying a condition among pre-registered implementing items based on a result of the estimation by the estimation unit, the implementing item being a pre-registered living activity which the target person performs; and
a reception apparatus that receives a notification from the information processing apparatus,
wherein the activity which the target person is expected to perform is estimated based on at least one of clothing or a possession of the target person recognized from the captured image.

18. An information processing method comprising the step of:
analyzing a captured image obtained by image capture with an image capturing apparatus;
estimating at least one of information indicating an emotion of the target person based on the analyzing; and
sending notification of an implementing item satisfying a predetermined condition among pre-registered implementing items based on the estimation;
wherein the activity which the target person is expected to perform is estimated based on at least one of clothing or a possession of the target person recognized from the captured image.

19. A non-transitory computer readable storage medium storing a program for cuasing a computer to execute:
analyzing a captured image obtained by image capture with an image capturing apparatus;
estimating at least one of information indicating an emotion of the target person based on the analyzing; and
sending notification of an implementing item satisfying a predetermined condition among pre-registered implementing items based on the estimation,
wherein the activity which the target person is expected to perform is estimated based on at least one of clothing or a possession of the target person recognized from the captured image.

* * * * *